United States Patent [19]

Dereser

[11] 4,289,536

[45] Sep. 15, 1981

[54] GLASS FIBER REINFORCED CEMENTS AND PROCESS FOR MANUFACTURE OF SAME

[75] Inventor: Ernst Dereser, Goe, Belgium

[73] Assignee: Owens-Corning Fiberglas Corporation, Toledo, Ohio

[21] Appl. No.: 131,348

[22] Filed: Mar. 19, 1980

Related U.S. Application Data

[63] Continuation of Ser. No. 953,142, Oct. 25, 1978, abandoned.

[51] Int. Cl.$^3$ .............................................. C04B 7/02
[52] U.S. Cl. ...................................................... 106/99
[58] Field of Search ........................................ 106/99

[56] References Cited

U.S. PATENT DOCUMENTS 3,062,670  11/1962  Marzocchi et al. .................... 106/99
4,090,884  5/1978  Goeman ................................. 106/99

*Primary Examiner*—James Poer
*Attorney, Agent, or Firm*—Ronald C. Hudgens; Kenneth H. Wetmore; Keith V. Rockey

[57] ABSTRACT

A process and composition for use in the manufacture of fiber-reinforced cementitious products. In the preferred practice of the invention, glass fibers are coated with a size composition containing a finely divided inorganic material having a high surface area and a polyelectrolyte, and the resulting coated glass fibers are then laid down, along with a cement composition formulated to contain cement, the inorganic material and the polyelectrolyte, whereby water is removed from the cement composition to form a glass fiber reinforced cementitious product arranging to the Matschek or Magniani process.

26 Claims, No Drawings

GLASS FIBER REINFORCED CEMENTS AND PROCESS FOR MANUFACTURE OF SAME

This is a continuation of application Ser. No. 953,142, filed Oct. 25, 1978, now abandoned.

This invention relates to reinforced cements and to compositions for use in the manufacture of reinforced cementitious products.

It is now well known that various fibers can be used in the reinforcement of cementitious products. One of the more well-known reinforced cementitious products is cement reinforced with asbestos fibers. The asbestos fibers are combined with cement in the form of a built-up laminate to provide a reinforced product, such as cement pipes and cement sheets or boards and the like, having good strength characteristics.

In the manufacture of such asbestos fiber reinforced cementitious products, two processes are well-known to those skilled in the art. The first is the so-called Hatschek process for the production of reinforced cementitious pipe and the second is the Magniani process for the production of boards formed of reinforced cement. In both of the processes, asbestos fibers are mixed with a cement slurry to form a pulp, and then the pulp is placed onto a foraminous forming member (a cylinder in the case of the Hatschek process and a flat, usually endless, belt in the Magniani process). Moisture from the slurry is removed by applying suction thereto whereby water is drawn through the foraminous forming member.

The mechanism underlying the effectiveness of asbestos fibers in the manufacture of reinforced cementitious products is not fully understood at the present time. The asbestos reinforcement appears to maintain, to at least some degree, the retention of water as the reinforced cement product is being manufactured to prevent excessive dehydration or dewatering which would cause the cement product to crumble.

It has been hypothesized that the high surface activity of asbestos fibers makes them highly reactive to retain small cement particles along with water to prevent cement from being carried off with the water during dehydration or dewatering on the foraminous support. That high reactivity is accentuated by the fact that the asbestos fibers have a high specific surface area (viz., of the order of 10–20 $m^2/g$.). Thus, the highly reactive surfaces of the asbestos fibers are believed to flocculate the cement and retain it to provide a reinforced cement product having good structural strengths.

Various attempts have been made to omit asbestos from such reinforced cementitious products but without success. In the absence of the asbestos fibers dispersed in the cementitious material, the rate at which water is removed so that the cementitious product can be cured is significantly increased. In addition, the green strength of the reinforced cementitious product, before cure, is drastically reduced as a result of excessive dewatering resulting in delamination.

In addition to Hatschek or Magniani processes the invention is suitable for practice in filter press process.

It has been proposed, in French Pat. No. 2,317,250, to partially replace asbestos fibers with glass fibers. Even that technique has not met with any appreciable success. Glass fibers, when combined with cementitious materials in the manufacture of reinforced cementitious products have a tendency to adhere together, remaining in bundles, thereby disturbing the rate at which water can be removed through the foraminous forming member. In general, the presence of glass fibers in such reinforced cement products makes such products, in the hydrated state, too porous and causes the water present in the cement slurry to be removed too rapidly, carrying with it large quantities of the cement itself. Because glass fibers have quite low surface areas (of the order of 0.1–0.2 $m^2/g$.), they do not share in the ability of asbestos to retain either cement or water. Thus, it has not been possible, up to the present invention to form, on a Hatschek machine, reinforced cement products containing more than 2% by weight of glass fibers.

It is accordingly an object of this invention to provide a method for producing and to produce glass fiber-reinforced cementitious products.

It is a more specific object of this invention to provide treated glass fibers and a size composition for use in the manufacture of same wherein the size coating on the glass fibers and additives to the cementitious slurry enable the glass fibers to be distributed through a cementitious pulp and thereby regulate the rate at which water is drawn therefrom in the manufacture of glass fiber-reinforced cementitious products.

It is yet another object of the invention to provide an improved process for forming fiber reinforced cementitious products wherein glass fibers are blended with cementitious materials and then formed into a glass fiber reinforced cementitious product.

The concepts of the present invention reside in the discovery that glass fibers can be employed as reinforcement in the manufacture of reinforced cementitious products when cement system includes, as a component of the size on the glass fiber surfaces or as a component of the cement slurry (or both), an inorganic, finely divided particulate material having a high surface area in combination with polyelectrolytes. It has been unexpectedly found that the presence of the inorganic material and the polyelectrolyte serve to markedly increase the amount of cement particles and water retained by the glass fibers. It is therefore possible to produce, when desired, a glass fiber reinforced cement product containing as much as 30% glass fibers by weight, all without adversely affecting the structural properties of the reinforced product.

In the preferred practice of the invention, glass fibers which may or may not have been previously sized (as in forming) are sized with a size composition containing, as the essential ingredients, the inorganic material and the polyelectrolyte. The glass fibers are then laid down on a foraminous support member with a cement slurry which has also been formulated with the inorganic material and polyelectrolyte(s). Water is then removed in a conventional manner (as by applying a vacuum to the foraminous support) to effect partial dehydration or dewatering of the glass fiber-cement composite after curing, the result is a fiber reinforced-cement product having high structural strengths.

As the inorganic material, use is preferably made of a finely divided siliceous material having a small particle size, preferably less than 10 microns, and a high specific surface area (i.e., surface areas greater than 20 $m^2/g$ and most preferably in the range of 75–500 $m^2/g$). Best results have been obtained with a specially treated bentonite known as Altonit.

Good results can also be achieved with fumed silica, diatomaceous earth or like silicas.

The term "polyelectrolyte" includes flocculating agents, such materials which have been found to provide good results are the flocculating agents Hercofloc 900 or Delfloc 50-V, both of which are commercially available. Surfactants and wetting agents may be used together with the polyelectrolytes.

The total amount of inorganic material employed is not critical, and can be varied within relatively wide limits. Best results are usually obtained when the inorganic material constitutes from 5 to 50% by weight, based on the weight of the cement employed, and preferably 10 to 25% by weight. Similarly, the amount of the polyelectrolyte can be varied, usually within the range of 0.01 to 1% by weight based on the weight of the cement employed.

Where in the preferred embodiment, the inorganic material is present in a size applied to the glass fibers, the size composition is formulated, on a solids basis, to include from 10 to 75% inorganic material and 1 to 25% polyelectrolyte. It is sometimes preferred to formulate the size with film-former which is compatible with the polyelectrolyte. Suitable are starches or similar film-formers and/or vinyl resins. One vinyl resin which provides good results is polyvinyl alcohol such as "Mowiol 4.88" from Hoechst AG, Germany.

In addition, the size can be formulated to include other conventional additives such as glass fiber lubricants, wetting agents, etc. Suitable lubricants include Sodamine or Emerlube 7484. The amount of the film-former generally ranges from 5-35% by weight and the lubricant from 1.0 to 15%, based on the solids content of the size. The size is applied to the glass fibers in amounts ranging from 0.1 to 25% solids by weight based on the weight of the glass fibers. If the fibers are used without additives to the cementitious slurry, the solids of glass sizing will be in the range of 5 to 200% or more of glass weight.

In the application of the size composition to glass fibers, use can be made of any of a variety of known application techniques. For example, the glass fibers can be passed in contact with a roller wet with one of the size compositions. Alternatively, the size compositions can be sprayed onto the glass fibers.

Glass fibers used in the practice of this invention can be "E" glass fibers, well known to those skilled in the art; such fibers are described in U.S. Pat. No. 2,334,961. Preferred glass fibers used in the practice of this invention, however, are alkali resistant glass fibers. Such glass fibers are now well-known to those skilled in the art, and are described in U.S. Pat. Nos. 3,840,379, 3,861,927 and 3,861,926.

In combining glass fibers treated in accordance with this invention with cementitious material, use can be made of any of a number of cements of the same type employed in the art. Suitable cementitious materials include cement, Portland cement, concrete, mortar, gypsum, hydrous calcium silicate, etc. The treated glass fibers, generally in an amount ranging from 1 to 25% by weight based upon the weight of the cement are blended with a cement slurry, either with or without the addition of other fibers such as asbestos fibers. When such other fibers are used, they are generally present in an amount ranging from 1-10% by weight based upon the weight of the cementitious material. The pulp resulting from blending the fibers and the cementitious material is then placed in contact with a foraminous forming member in accordance with the well-known Hatschek or Magniani processes and a vacuum applied to the foraminous member to remove water from the fiber reinforced cementitious product. The product is then cured in accordance with conventional techniques.

The resulting fiber reinforced cementitious product is characterized by high strength, and can be used as various building materials in accordance with well-known principles of the prior art.

Having described the basic concepts of the invention, reference is now made to the following examples which are provided by way of illustration and not by way of limitation, of the practice of this invention in the treatment of glass fibers with the size compositions of this invention and use of the treated glass fibers in the manufacture of glass fiber-reinforced cementitious products.

EXAMPLE 1

This example illustrates the preparation and use of a size composition in accordance with the concepts of this invention.

A size composition is formulated as follows:

|  | Parts by weight |
|---|---|
| Polyvinyl alcohol (Mowiol 4.88) | 14.0 |
| Altonit | 18.0 |
| Lubricant (Emerlube 7484) | 4.3 |
| Flocculating agents: Delfloc 50-V | 5.0 |
| Mercofloc 900 | 1.0 |

The above size composition is combined with water to make up a suspension having a solids content of 2.5% by weight solids.

The foregoing size composition is applied to glass fibers by roller coating. The resulting fibers coated with the size composition have a gel-like coating on the surfaces thereof, the coating exhibiting good adhesion to the glass fiber surfaces.

EXAMPLE 2

This example illustrates the use of glass fibers treated in accordance with the practice of this invention in the manufacture of glass fiber-reinforced cementitious pipe or sheet.

Glass fibers treated in accordance with Example 1 are blended with a cement composition having the following composition:

| Cement Composition | |
|---|---|
|  | Parts by weight |
| Cement | 800 |
| Altonit | 140 |
| Mercofloc 900 | 0.4 |
| Water | 8000 |

The glass fibers, chopped to lengths of about ⅛ to 3 inches, are employed in an amount corresponding to about 10% by weight based upon the weight of the cement. The pulp thus formed is then processed in the known way in a Hatschek machine to form fiber reinforced cement pipes or sheets having good strength characteristics. This may include the use of additional polyelectrolytes.

While the foregoing description is based on the use of glass fibers as reinforcement, it will be understood that the concepts of the present invention lend themselves to the use of other fibers, including natural and synthetic organic and inorganic fibers, such as wool, dacron, nylon, polyester fibers, metal, etc.

The invention may be practiced to allow the use of mineral fibers, particularly glass fibers in paper-making systems and in wet process board and mat systems by improving the processability characteristics of such inorganic fibers.

It will be understood that various changes and modifications can be made in the details of procedure, formulation and use without departing from the spirit of the invention, especially as defined in the following claims.

I claim:

1. A fiber reinforced cementitious product comprising a cement as a continuous phase and fibers dispersed as reinforcement in the continuous phase, with said product including flocculating agent and a finely divided inorganic material having a surface area greater than 20 $m^2/g$ present in (a) admixture with the cement, (b) as a size coating on the fibers or (c) both.

2. A product as defined in claim 1 wherein the fibers are glass fibers.

3. A product as defined in claim 1 wherein the inorganic material is selected from the group consisting of a silica, a bentonite and a diatomaceous earth.

4. A product as defined in claim 1 wherein the glass fibers are present in an amount up to 30% by weight based on the weight of the cement.

5. A product as defined in claim 1 wherein the inorganic material is bentonite.

6. A product as defined in claim 1 wherein the flocculating agent and the inorganic material are present as size coating on the fibers.

7. A product as defined in claim 6 wherein the size coating also includes a lubricant.

8. A product as defined in claim 6 wherein the size coating also includes a film-forming resin.

9. A product as defined in claim 1 wherein the inorganic material and the flocculating agent are present both in admixture with the cement and as a size coating on the fibers.

10. A glass fiber reinforced cementitious product comprising a cement as a continuous phase and glass fibers dispersed in the cement as reinforcement therefor, said cement being formulated to include a flocculating agent and a finely divided inorganic siliceous material having a surface area greater than 20 $m^2/g$, with the glass fibers having a size coating on the surfaces thereof, said coating comprising said flocculating agent and said inorganic material.

11. A product as defined in claim 10 wherein the inorganic material is bentonite.

12. A product as defined in claim 10 wherein the size coating also includes a film-forming resin.

13. In a process for the manufacture of fiber reinforced cementitious products wherein fibers are mixed with a cementitious material to form a pulp, the pulp is contacted with a foraminous forming member from which water is withdrawn to form a green product and the green product is cured, the improvement comprising using a pulp in which one of the cementitious material and the glass fibers contains polyelectrolytes and a finely divided inorganic material having a high surface area.

14. A process as defined in claim 13 wherein the fibers are glass fibers.

15. A process as defined in claim 13 wherein the polyelectrolyte and the inorganic material are present both in admixture with the cementitious material and as a size coating on the fibers.

16. In a process for the manufacture of glass fiber-reinforced cementitious products wherein glass fibers are mixed with a cementitious material to form a pulp, the pulp is contacted with a foraminous forming member from which water is withdrawn to form a green product and the green product is cured, the improvement comprising mixing glass fibers having a size coating thereon, said coating containing a polyelectrolyte and a finely divided inorganic siliceous material having a surface area greater than 20 $m^2/g$, with a cement composition containing cement, said polyelectrolyte and said inorganic material.

17. A process as defined in claim 16 wherein the polyelectrolyte is selected from the group consisting of surfactants, wetting agents, and flocculating agents.

18. A process as defined in claim 16 wherein the inorganic material is a bentonite.

19. A process as defined in claim 16 wherein the size coating also includes a film-forming resin.

20. A product as defined in claim 1 wherein the finely divided inorganic material has a surface area ranging from 75 to 500 $m^2/g$.

21. A product as defined in claim 1 wherein said fibers are alkali resistant glass fibers.

22. A product as defined in claim 6 wherein the inorganic material is present on the fibers in an amount within the range of 10–75% and the polyelectrolyte is present in an amount within the range of 1–25% by weight.

23. A product as defined in claim 1 wherein the inorganic material present in the cement constitutes from 5–50% by weight based upon the weight of the cement.

24. A product as defined in claim 1 wherein the fibers are composed of fibers and asbestos fibers.

25. A process as defined in claim 13 wherein the fibers are alkali resistant glass fibers.

26. A product as claimed in claim 1 wherein the product also includes a member selected from the group consisting of a surfactant and a wetting agent.

* * * * *

UNITED STATES PATENT AND TRADEMARK OFFICE
CERTIFICATE OF CORRECTION

PATENT NO. : 4,289,536
DATED : September 15, 1981
INVENTOR(S) : Ernst Dereser

It is certified that error appears in the above—identified patent and that said Letters Patent is hereby corrected as shown below:

In the Abstract, cover page: next to last line should read:

cementitious product according to the Hatschek or

Column 4, line 28 should read:

Hercofloc 900                    1.0

Column 4, line 53 should read:

Hercofloc 900                    0.4

*Signed and Sealed this*

*Twenty-fourth* Day of *November 1981*

[SEAL]

*Attest:*

GERALD J. MOSSINGHOFF

*Attesting Officer*           *Commissioner of Patents and Trademarks*